Dec. 1, 1942.　　　　R. M. HEINTZ　　　　2,303,637
POWER TRANSMISSION DEVICES
Filed July 21, 1941　　　4 Sheets-Sheet 2

INVENTOR:
RALPH M. HEINTZ
BY
ATTORNEYS.

Dec. 1, 1942.   R. M. HEINTZ   2,303,637
POWER TRANSMISSION DEVICES
Filed July 21, 1941   4 Sheets-Sheet 3

INVENTOR:
RALPH M. HEINTZ
BY Robb&Robb
ATTORNEYS.

Dec. 1, 1942.   R. M. HEINTZ   2,303,637
POWER TRANSMISSION DEVICES
Filed July 21, 1941   4 Sheets-Sheet 4

INVENTOR:
RALPH M. HEINTZ
BY
ATTORNEYS.

Patented Dec. 1, 1942

2,303,637

UNITED STATES PATENT OFFICE 2,303,637

POWER TRANSMISSION DEVICE

Ralph M. Heintz, Cleveland, Ohio, assignor to Jack & Heintz, Inc., Cleveland, Ohio Application July 21, 1941, Serial No. 403,406

5 Claims. (Cl. 74—291)

My invention appertains to the art of power transmission gearing and involves an improved gearing unit of the type set forth in my copending application for patent, Serial No. 333,376, filed May 4, 1940, now matured into Patent No. 2,271,640, issued February 3, 1942.

Gearing of the class of this invention affords an advantageous impulse starter unit especially useful for the starting of airplane or like explosive engines, but is adapted for any general use where drive gearing units are availed of in which it is desirable to limit the magnitude of force which may be applied to a part to be driven—in the case of engine starters to the engine engaging member or clutch. In the carrying out of my invention there is utilized a special construction of friction control unit forming virtually a part of certain primary gearing embodied in the device and one of the objects of my invention has been to improve upon the particular type of friction control means as embodied in my application above identified, with a view to certain simplification of the parts employed, providing a more accessible arrangement of the friction parts and the adjusting means for the latter.

In transmission gearing units of the type of my invention there are usually employed suitable motor driving means and associated alternatively usable hand driving means for effecting the rotation at high speed of a flywheel or inertia member, the driving torque of which is employed for the operation of whatever type of device is to be actuated by the gearing unit or starter of my invention. A further object of my invention, therefore, has been to re-design the construction of gearing proposed in my previously identified application with a view to the disposing of the motor or other driving mechanism in substantially concentric relation with respect to the driven member, which, in the present instance, is an engine starting clutch or engaging part, also to make provision for the arrangement of certain planetary gearing which includes certain elements of the friction control unit or torque responsive device, likewise concentric with relation to the axis or driving shaft of the motor so that the driving torque may be transmitted as directly as possible from the motor to the driven member or engine engaging clutch.

My invention also involves certain other detail features of construction by way of improvement of gearing units of the type described in reference to the arrangement of the torque responsive device and the direct operating parts therefor as related to the gearing and to the motor.

An important feature of the present invention resides in certain novel construction of the torque responsive device employed having to do particularly with the camming tooth formation of the reaction members. This formation is such that wear on the camming surfaces is equalized where such wear may occur, and the releasing and re-engaging phases of operation are correspondingly affected so as to maintain the operation of the comating camming parts equalized completely over the area of these parts, thereby to ensure the highest efficiency of the structure in the releasing and re-engaging actions of said parts.

As a result of the redesign of the construction of gearing unit referred to, it is possible to assemble practically all of the parts of the unit including the motor and other driving means in an aligned casing or housing affording material advantages in reference to compactness and ease of mounting of the unit for association with an engine or other mechanism that is to be operated thereby. However, it is to be understood that I do not wish to be limited to the exact arrangement of the parts as hereinafter described in detail since they may be modified as to disposition in accordance with the latitude allowed by the claims finally appended hereto.

The various features of construction and advantage of my invention will be understood more fully upon reference to the following specification and to the accompanying drawings, in which.

Figures 1, 1A:
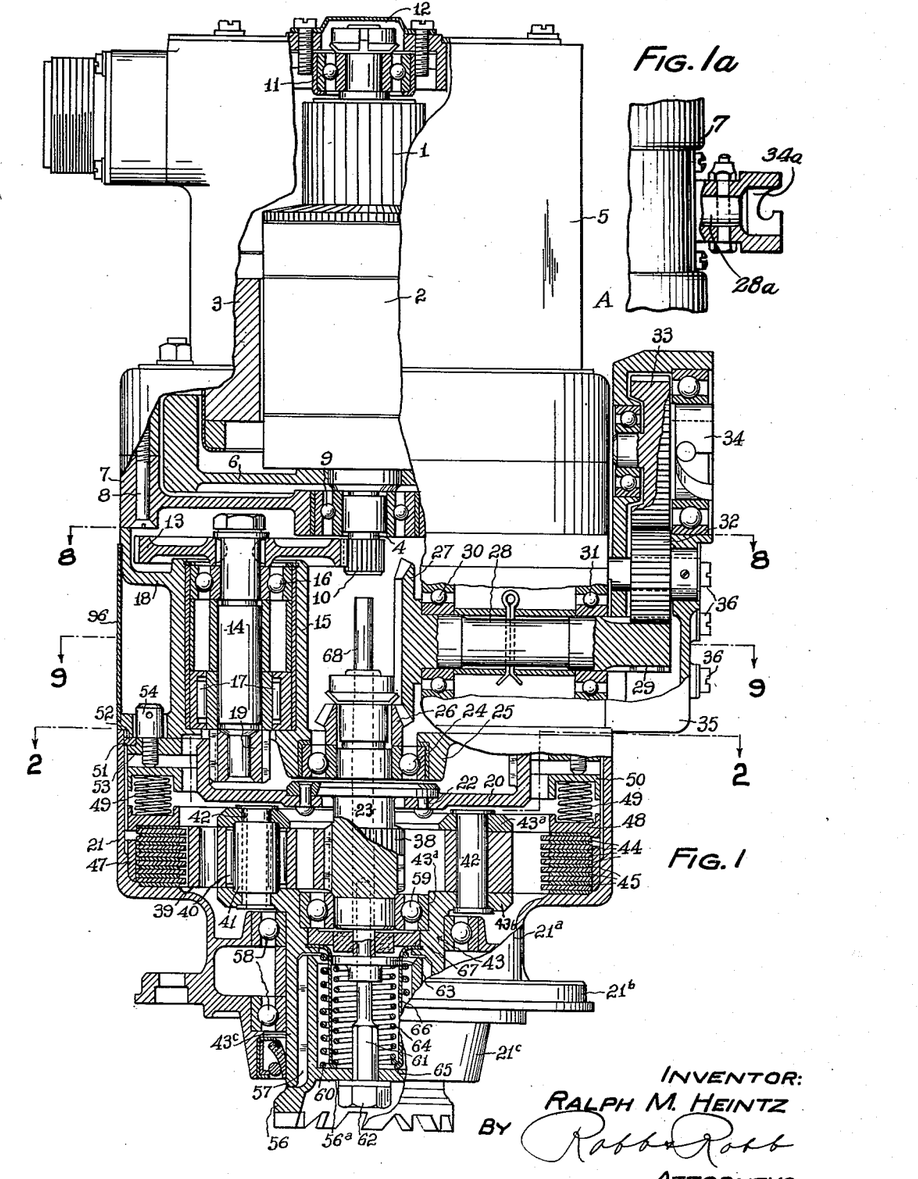
Figure 1 is a general view largely in section and partly in elevation of a transmission gearing unit embodying the essential features of my present invention, the sectional illustration depicted being taken about on the line 1—1 of Figure 5.
Figure 1a is a fragmentary elevational view showing a modified form of hand crank receiver, external parts being shown in section.

Referring more particularly to Figure 1 of the drawings, it will be seen that a transmission gear device of the construction of the invention is made up of a series of unit features which may be characterized as the motor unit, drive gear unit, friction control or torque responsive unit, and engine engaging units. These several units are assembled, so to speak, end for end, or in alignment, and, for enclosing said units, there are employed housing sections that generally together make up the aligned parts of the casing for the entire unit.

*Motor unit*

This unit, as seen in Figure 1, is largely a conventional type of construction embodying the commutator 1, the armature 2, the field 3, and the motor shaft 4, the said parts being enclosed in the motor housing or section 5 of the casing generally denoted at A. On the armature 2 is fixed and carried the inertia member or flywheel 6 which is enclosed partially by the lower end of the housing 5 and by a housing section 7 which is attached to the lower end of said housing 5 by suitable bolts 8. The motor shaft 4 projects downwardly from the armature 2 and the inertia member 6 through the central portion of the housing section 7 where suitable bearing means 9 are provided for said shaft, the shaft carrying below the bearing means the driving pinion 10.

It will be understood that any suitable bearing means 11 will be provided at the upper end of the motor or armature shaft and suitably enclosed by a cap plate 12 or otherwise covered according to motor practice.

*Drive housing and gearing*

The driving pinion 10 of the motor shaft 4 meshes with a spur gear 13 mounted upon a countershaft 14, the said countershaft and gear being supported in a barrel 15 providing an enclosure for the bearings 16 and 17 for the countershaft 14. The barrel 15 is an integral well or sleeve-like structure carried by the drive housing or section 18 of the casing A and the lower end of the countershaft 14 has keyed thereto a pinion 19 disposed within the surrounding internal gear 20. The internal teeth of the gear 20 mesh with the teeth of the gear 19 and the gear 20 is disposed in the control unit housing 21, being directly attached, as by fastenings 22, to a driven shaft 23 supported by a suitable upper bearing 24 in the lower horizontal web portion 25 of the drive housing 18. The shaft 23 extends above the bearing 24 and carries at its upper end a bevel gear 26 that forms a part of the manual driving means for said shaft. The gear 26 meshes with another bevel gear 27 on the inner end of the horizontal shaft 28 which extends from a point near the axis of the entire unit to a point external to the casing A where the shaft 28 is equipped with gear teeth 29. The shaft 28 is supported by suitable spaced bearings 30 and 31 and the teeth 29 of said shaft mesh with an idler gear 32 which in turn meshes with a driving gear 33 operable by a crank socket member 34, into which may be introduced the cranking end of a hand crank to be employed for operating the gear 27 and the shaft 23 for effecting rotation of the inertia member or flywheel 6, as will be later described. The parts 34, 33, 32, and the outer end of the shaft 28 are carried in an offset or eccentric gearing housing 35 suitably fastened to the side of the main housing A and directly secured to the drive housing section 18.

The gear casing or housing 35 is adjustably mounted on the casing A by the bolts 36 so that it may be turned relatively to the axis of the shaft 28 whereby to alter its position, dependent upon the disposition of the entire transmission gear unit in relation to the engine of an airplane or any other mechanism that is to be operated by the transmission gear unit of my invention.

In turn, it will be understood that in lieu of the offset or eccentric gear housing 35, there may be substituted for this housing a concentric housing member with enclosed planetary or other reduction gearing, capable of being operated in turn by a hand crank socket member like the member 34. Under certain conditions I employ the concentric gear housing unit in lieu of the offset or eccentric gear housing 35, the former being illustrated in Figure 1a wherein similar parts are indicated by the same reference characters with the subscript a added.

The bearings 30 and 31 for the shaft 28 are mounted in a removable barrel or sleeve 37 normally prevented from displacement by the fastening bolts 36, but permitting of the removal as a unit of the eccentric or offset gear housing 35, the shaft 28, and the gear 27 at the inner end of said shaft. The removal can be effected by mere displacement of the screw bolts 36 at will.

*Control unit or torque responsive mechanism*

The shaft 23 is a hollow shaft and, as previously stated, extends downwardly from within the drive housing 18 to within the housing 21 of the planetary gear control unit. Near its lower end the shaft 23 carries the sun gear 38 which is integral therewith and in mesh with one or more planet gears 39. The gears 39 are mounted upon needle bearings 40 cooperating with inner race members 41 which surround sleeve shafts 42. The shafts 42 are mounted in a planetary gear carrier or spider 43 composed of the upper member 43a and the lower member 43b, the opposite ends of the sleeve shafts 42 being upset to position them on the carrier 43 and the planetary gears being disposed between the upper member 43a and the lower member 43b of said carrier.

Figure 2:
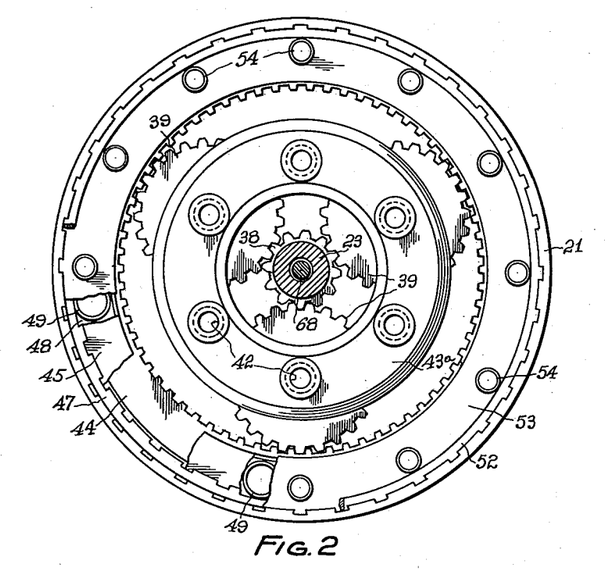
Figure 2 is a top plan view looking downwardly upon the friction control device or torque responsive mechanism in its engaged housing, the view being partly in section and taken on the line 2—2 of Figure 1, looking downwardly.
Figures 3, 4:
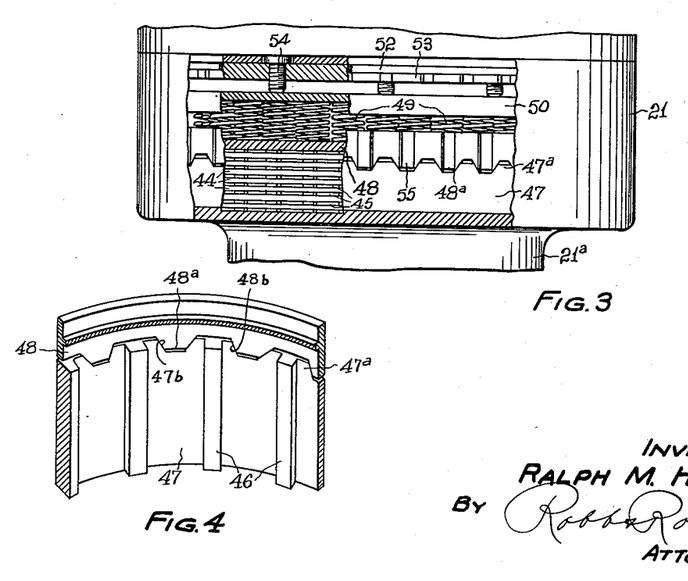
Figure 3 is an elevational view partly broken away and illustrated in section to bring out more clearly the arrangement of the friction plates, the main reaction ring or member coacting with said plates, the pressure ring and/or secondary reaction member, the auxiliary spring seat and pressure ring, and the adjusting means for the pressure rings or plates; also the co-mated camming elements or teeth intermediate the pressure plate or secondary reaction member and the primary reaction member or ring.
Figure 4 is a fragmentary perspective view showing the inner portion of the secondary pressure plate and/or reaction member broken away to bring out more clearly the relation of the camming teeth intermediate the secondary reaction member and the primary reaction ring.

A friction control or torque responsive device is included in the planetary gearing mechanism now being described and comprises a series of friction plates 44 having internal teeth, as seen best in Figure 2, which are intermeshed with the teeth of the planetary gears 39. Interleaved with the friction plates 44 are a series of friction plates 45, all of which have external teeth which intermesh with splines 46 on the inner side of the primary reaction ring 47 which is disposed in the housing 21 with its outer surface contacting the inner surface of the housing and adapted for slight rotative movement with respect to the housing. The reaction ring 47 is equipped at its upper end with camming members 47a which co-mate or mesh with corresponding camming members 48a extending downwardly from the outer portion of a combined pressure and secondary reaction plate or ring 48. The parts 48a and 47a are maintained in cooperation by a series of coiled springs 49 which are interposed between the plate 48 and the auxiliary pressure and adjusting plate 50, the latter being flanged downwardly similar to the manner in which the plate 48 is flanged upwardly so as in both cases to provide seat portions in which the springs 49 are received.

Respecting the comating camming members or teeth 47a and 48a, it is notable that they are formed on the respective reaction rings 47 and 48 in a peculiar manner particularly adapted for their use in this invention. The said teeth 47a and 48a are formed to provide surface contact as distinguished from line or point contact such as would generally obtain if these teeth were made so that their surfaces 47b and 48b would lie in planes at right angles to tangential planes of their respective reaction rings where said tangential planes contact the outer surfaces of the reaction rings and include the tangent x—x as shown in Figure 10.

In other words, the surfaces 47b and 48b of the teeth 47a and 48a of the respective reaction rings or members are so formed that they include a series of involute curves at their contacting surfaces. Said curves evolve from a base circle having a diameter preferably more than .70 and generally not greater than .90 of the mean diameter of the reaction rings themselves. The starting points of the successive involutes form a helix on the base circle.

Figures 8, 9, 10, 11:
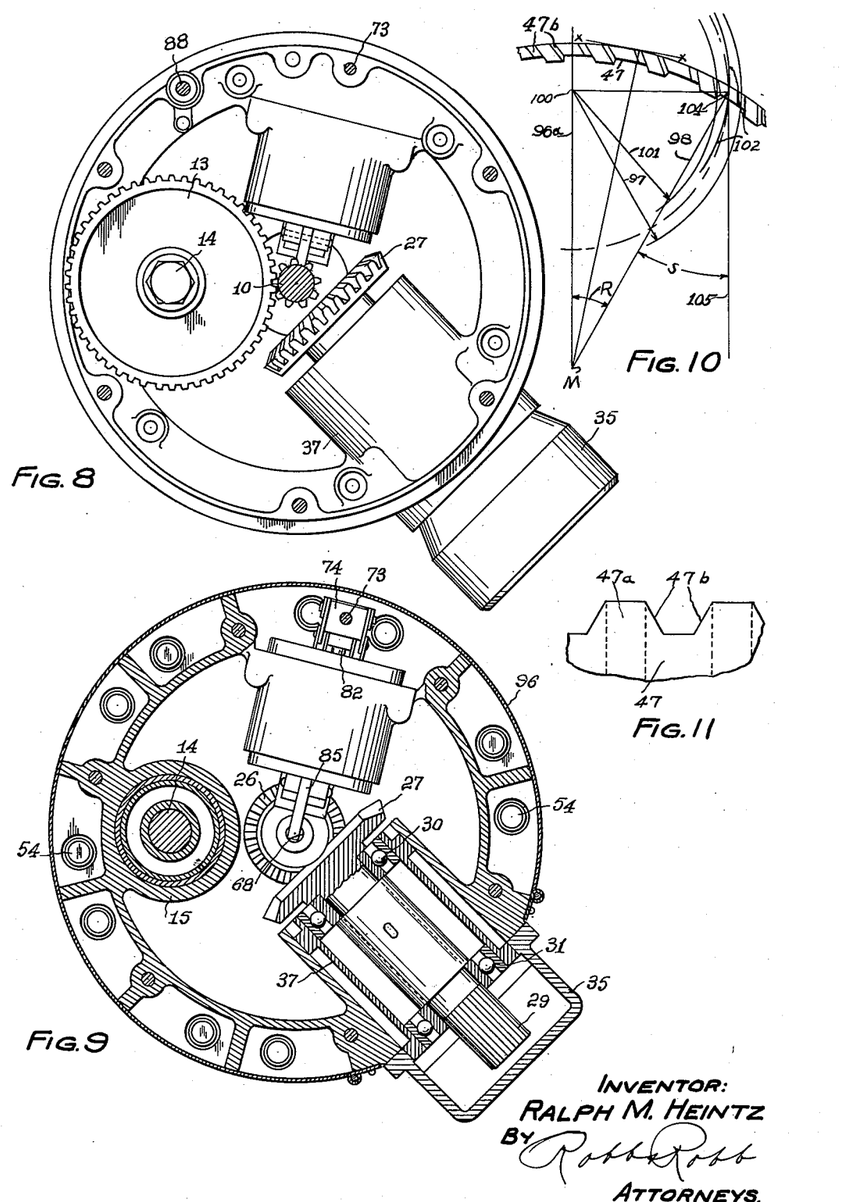
Figure 8 is a top plan view of the drive housing or section of the main casing of the gearing unit illustrating more fully the disposition of the engine engaging clutch solenoid unit and manually operable crank unit, the view being taken about on the line 8—8 of Figure 1, looking downwardly.
Figure 9 is a view similar to Figure 8, but taken about on the section line 9—9 of Figure 1 and illustrating more clearly the mounting of the countershaft connecting the motor drive shaft with the planetary gearing and also illustrating the manual crank drive unit more fully.
Figure 10 is a somewhat diagrammatic illustration of the derivation of the tooth surfaces of the reaction rings.
Figure 11 is a broken away section of one of the camming rings.

More particularly, and for illustration purposes, Figure 10 diagrammatically illustrates the method of generating the tooth surfaces of the reaction rings, the reaction ring 47 being used as an example.

In order to make more clear the actual method, the path of the cutter used for cutting the teeth and other factors are used, wherein M denotes the center of the ring 47, 96a represents a radius line, and point 104 is taken as a mean point in the diameter of the reaction ring 47. It is therefore apparent that a radius line 98 connecting point M with point 104 will be the mean radius of the reaction ring. The angle between the radius line 96a and the mean radius line 98 is denoted R. A line 105 passing through the point 104 and at an angle to the mean radius line 98 equal to the angle R forms the spiral angle S. Thereafter, a line 106 perpendicular to the line 105, which is parallel to the radius line 96a is passed through a point 100 on the radius line 96a. This line 106 is the mean radius line of the cutter used to generate the camming surfaces, the center of the cutter being at the point 100. The arcs generated by the lines 101 and 97 show the inside and outside circumference of the cutter. The distance from the point 100 to the center point M therefore becomes the radius of the base circle, the base circle having a diameter preferably more than .70 and generally not greater than .90, the mean diameter of the reacting ring 47.

The curved line 102 which illustrates one of the successive theoretical involutes whose starting points form a helix on the base circle lies outside the average or mean cutter radius 106 at its outer or upper portion in the drawings and inside the mean cutter radius at its inner portion, which is nearer the base circle which would pass through the point 100 with its center at M. At the mean point 104 the involute curve 102 and the mean cutter radius coincide for all practical purposes, the degree of separation at the mean point 104 being only a fraction of a tenth when the spiral angle S varies from 25 degrees to about 40 degrees.

Of course, it is to be understood from the foregoing that the mean point 104 is only one of the points on the mean circle which it includes, through or very nearly through which the theoretical involute curves pass, and has only been used as an example. It is likewise true that the point 104 may also be actually on the surface 47b or 48b, and has only been shown on the bottom of the tooth for clarity.

The housing 21 is formed with an annular internal groove 51 at its upper end, which groove receives a split lock ring 52 that forms an upper abutment for the adjusting screw plate or ring 53. The plate 53 carries a series of adjusting screws 54 having turnable heads and having threaded connection, by their screw stems, with openings in the plate or ring 53. The lower ends of the adjusting screws 54 engage the upper surface of the auxiliary pressure plate 50, and, by substituting screws like the screws 54 but of greater or less length, it is possible to vary the normal adjusted position of the auxiliary plate or pressure ring 50 whereby to control the amount of friction intermediate the interleaved plates 44 and 45. This control of friction is of course obtained by varying the tension of the springs 49 through variation in the adjustment of the pressure plate or ring 50.

The combined pressure plate and secondary reaction ring 48 has external teeth on its periphery designated 55 which engage in grooves formed on the inner surface of the housing 21, thereby to prevent rotation of the member 48, but not interfering with the axial movement of the latter incident to the cooperation of the springs 49. In other words, the pressure plate 48 is splined to slide within the control unit housing 21 vertically as seen in Figure 1 and in the direction of the axis of the casing A.

It will be apparent that the various friction plates, reaction members, associated springs, and adjusting parts that have just been described, are housed within the control unit housing 21 and make up the control unit or torque responsive device previously referred to in association with the several planetary and sun gears described.

The planetary gear carrier 43 is extended at its lower axial portion to provide a sleeve extension 43c which projects downwardly to a point partially outward of the lower end of the control unit housing 21. In turn, the housing 21 is provided with an end extension 21a having an attachment flange 21b by which the entire transmission gear unit of my invention may be mounted upon or associated with the crank housing of an airplane engine, for instance, suitable bolts, not shown, being employed for the purpose. Upon the flange 21b the housing 21 projects by way of extension to provide a hollow boss 21c and the engine engaging clutch or driven member of the unit designated 56 is mounted within the end portion of the housing 21 and directly within the hollow portion of the sleeve extension 43c of the planet gear carrier 43. The engine engaging or driven member 56 is a common type of clutch and is interlocked to the extension 43c of the gear carrier 43 by splined connecting teeth 57 formed on both the parts 56 and 43c.

The arrangement of the engine engaging clutch and its mode of connection with the gearing of the general unit is such as to enable the high speed operation of the inertia member 6 to be transmitted by reduction gearing including the friction unit planetary gear parts, and connecting said inertia member with said driven member or engine engaging clutch 56.

Suitable bearings 58 are interposed between cast portions of the extension 21a of the housing 21 and the sleeve extension 43c of the planet gear carrier 43.

Other bearing means 59 are interposed between the shaft 23 and the recess 43d of the planet gear carrier 43.

*Operating means for the engine engaging clutch or driven member*

The clutch member 56, at its inner sleeve portion, has the outer closed end 56a thereof engaged at the inner side by an expansion coil spring 60 normally tending to project the clutch outwardly from the sleeve portion 43c of the planet gear carrier 43.

Passing through the closed end 56a of the clutch member 56 is an actuating rod 61 having a head 62 abutting with the outer surface of the part 56a. The rod 61 has a spring seat 63 thereon engaged by one end of an expanding spring 64, the opposite end of said spring engaging the outer end shoulder portion 65 of a fixed sleeve 66 mounted in the extension 43c of the gear carrier 43 in fixed relation to the latter by the provision of an inner end flange 67 interengaging a groove in the part 43c. The actuating rod 61 is adapted at its inner end to enter a socket or holder end portion of a secondary actuating rod 68 disposed in alignment with the motor shaft 4 and concentric with the axis of the engine engaging clutch 56. The secondary actuating rod 68 is slidable in and through the sun gear carrying shaft 23 with the means for actuating the parts 68 and 61, which virtually form a composite actuating rod, shown clearly in Figures 6 and 7 of the drawings.

Figures 5, 6, 7:
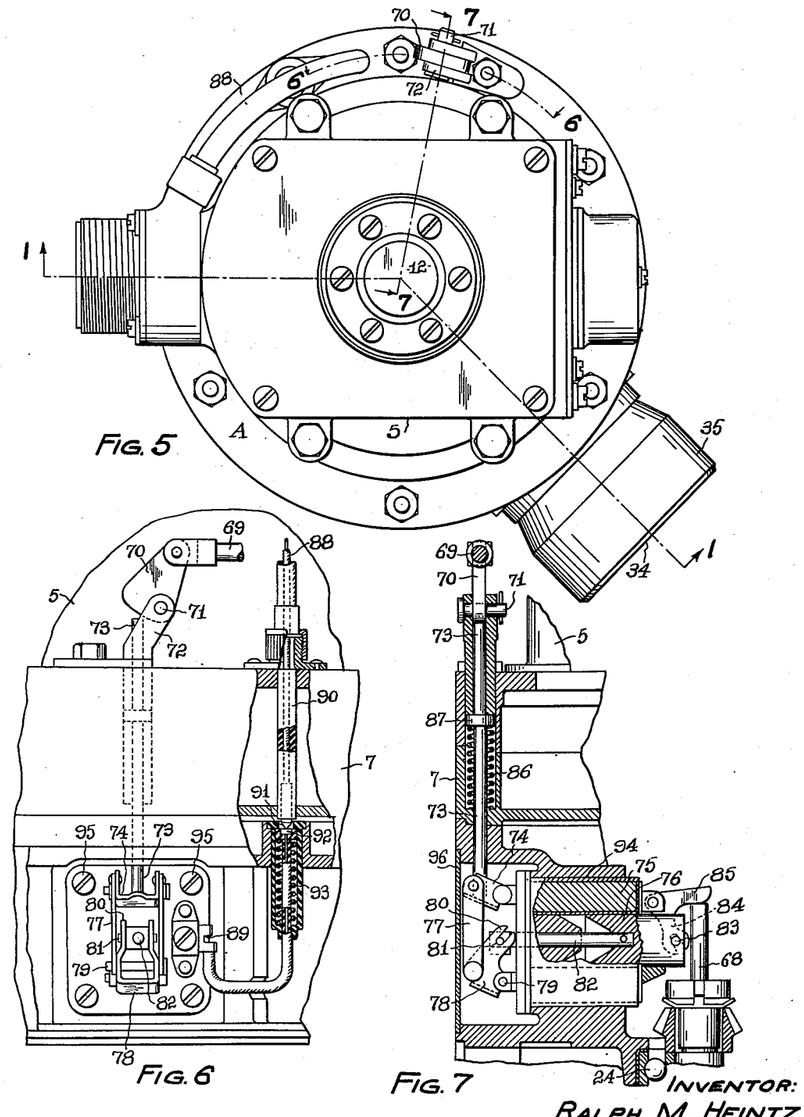
Figure 5 is a top plan view of the unit.
Figure 6 is a fragmentary view partly in section illustrating the manual and electric solenoid operating devices for the actuation of the engine engaging member or clutch, the view being taken about on the line 6—6 of Figure 5.
Figure 7 is a sectional view showing primarily the manually operated parts illustrated in Figure 6, the view being taken about on the line 7—7 of Figure 5.

Referring to the latter figures, there is illustrated a push rod 69 adapted to be manually actuated and leading externally of the casing A to a suitable point where manual pressure may be applied thereto. The rod 69 is connected to a cam 70 pivoted at 71 to a bracket 72. The cam 70 is adapted to engage a push rod 73 mounted in the inner portion of the motor housing 5.

The rod 73 coacts with a swinging link 74 supported adjacent to the windings 75 of a solenoid including the plunger 76. The link 74 is attached by links 77 to a swing lever 78 pivoted at 79. The lever 78 has a bifurcated end portion 80 engaging side pins 81 of a plunger rod 82 which is connected with the plunger 76. The plunger 76 in turn is connected by a pin 83 to the lower bifurcated arm 84 of an actuating bell crank lever 85, the upper arm of which normally engages the upper end of the secondary actuating rod 68, previously described.

Spring means 86, see Figures 6 and 7, in hollow portions of the parts 7 and 5, bears at the upper end thereof against a shoulder 87 on the push rod 73 and tends to maintain the rod in its uppermost position and the associated cam 70 and rod 69 in the positions of Figure 6. Also, this spring means 86 will restore these parts to such positions along with the connected parts that lead to the solenoid plunger 76 when manual pressure is not exerted against the manually operable rod 69 and likewise to restore these parts to such positions after the solenoid is operated electrically by means now to be described.

From the foregoing it is to be understood that the engine engaging clutch or driven member 56 may be operated by the manual means connected with the manually operated rod 69, or said member 56 may be operated by the energizing of the solenoid comprising the parts 75 and 76, previously referred to, through the closing of an electric circuit which includes said solenoid means.

Figure 6 in a general way illustrates the lead wire 88 of the electric circuit connecting with the solenoid means at the contact 89, and in order to permit of separation of the housing parts 5, 7, and 18, the electrical connection depicted in Figure 6 is made up of a contact rod 90 enclosing the lead wire 88 and having a lower contact member 91 yieldably engaging a spring actuated contact member 92 normally positioned upwardly as shown in Figure 6 by the spring 93.

It is to be understood that the solenoid unit shown in Figures 6 and 7 is removable bodily from the housing 18, being normally contained, as to the solenoid parts proper, in a horizontal or radially disposed recess 94 formed in the said drive housing 18.

Therefore, if repair or replacement of the solenoid unit is required, it is only necessary to remove certain screws 95, seen best in Figure 6, and the solenoid may be displaced after disconnection of the rod 73 and certain disconnection of contacts, etc., not material to the invention.

The operating means for the engine engaging clutch shown in Figs. 6 and 7 is disclosed and claimed in my copending application Serial No. 439,751, filed April 20, 1942.

Surrounding the drive housing 18 is a split band 96 easily displaceable by separating its ends whereby to enable quick access to the outer portions of the cast housing at which the adjusting screws 54 are located, to facilitate replacement of these screws by screws of greater or less lengths for the control of the amount of pressure of the springs 49 in relation to the parts 50, 48, 44, and 45.

*Operation of transmission gearing*

It will be assumed that the invention is adapted and located for use in conjunction with the engine of an airplane as starting means for the airplane motor, and under these conditions operation of the invention will involve the energizing of the motor armature 2 in the customary way whereby to drive the shaft 4 at high speed. Of course, the above operation effects a high speed movement of many thousand revolutions per minute of the inertia member or flywheel 6, and the driving torque of the said member 6 is now ready to be communicated through the clutch member 56 to the shaft of the engine of the airplane, said driving torque being greatly increased by the gears actuated in the unit which is in effect a gear reduction unit. Motion is transmitted from the pinion 10 on shaft 4 through gear 13, shaft 14, pinion 19, to the internal gear 20. The gear 20 drives the shaft 23, and the sun gear 38 of the latter shaft in turn drives the planet gears 39. The gear carrier 43 is thus rotated through the action of the planet gear operating in mesh with the internal ring gear of the planetary gearing, which ring gear is constituted by the interleaved friction plates 44. In this way, motion is ultimately transmitted through the gear carrier 43 to the clutch member 56, which is the driven member of the gearing unit.

The next operation involves the actuation of the solenoid plunger 76, which may be caused either electrically by energizing said solenoid electrically, or said plunger may be operated manually by the push rod 69 and connections leading therefrom to the plunger. The solenoid plunger operation will cause actuation of the rod members 68 and 61, longitudinal movement of which outwardly from the casing A will relieve the portions 56a of the clutch 56 of the pressure of the head 62, thereby permitting the spring 60, normally held compressed while the clutch 56 is in its inactive position, to force the clutch 56 outwardly for cooperation with the corresponding mating clutch member on the engine shaft of the airplane motor. In the above manner, the impulse starting effect or driving torque of the inertia member 6 is transmitted with great power and relatively low rotative motion of the clutch 56 to the airplane motor and the starting of the latter is effected in this manner. However, when the airplane motor or engine is started as soon as the speed of the engine shaft is greater than that of the clutch 56, the latter will be automatically disengaged from the clutch on the engine shaft and the operation of starting the airplane motor will be completed.

It is to be understood that the interleaved plates 44 and 45 of the friction control unit constitute elements of a planetary gear unit, involving, of course, the sun gear 38, the planet gears 39, and the plates 44 constituting the ring gear of such unit. The action of the friction plate control unit constitutes this unit as a torque responsive device, previously referred to herein, and in reference to the effect of resistance to the driving torque which may be created at the clutch 56 by the sudden engagement of said clutch and resistance forces set up at the engine shaft being driven, the said torque responsive device or unit operates in the following manner: Since the normal tendency of the planet gears 39 is to rotate the ring gear comprised of the plates 44 in an opposite direction to the rotation of the planet gears, this rotational force will tend to rotate the primary reaction ring 47. However, the rotational effect on the reaction ring 47 causes contact of the cam surfaces 47a thereon with the co-mated cam surfaces 48a of the secondary reaction ring and/or pressure ring 48, so that there will be a resulting axial movement of the secondary reaction member and pressure plate 48 to compress the springs 49, thereby releasing the friction between the interleaved plates 44 and 45 and thus momentarily discontinuing the application of the driving torque transmitted from the inertia member 6 to the clutch 56 when the resistance to the driving torque at the member 56 reaches a predetermined magnitude. Owing to the release of the application of the driving torque in the manner stated, the likelihood of breakage of the parts in the train of gearing and connections between the inertia wheel or member 6 and the clutch member 56 is avoided.

Of course, in actual use the release actions effected through the cooperation of the camming teeth 47a and 48a take place intermittently at high speed so that, effectively, discontinuance of the application of the driving torque at the clutch 56 takes place only when the magnitude of the resistance to the movement of the clutch member 56 reaches a predetermined point and is immediately followed by re-establishment of the frictional connection between the friction plates 44 and 45, this action occurring with great rapidity but being sufficient to provide release phases in the functioning of the friction control unit to accomplish the desired result.

An especial advantage of the formation of the camming members 47a and 48a lies in the fact that the side engaging surfaces of these members that are effective in the releasing and re-engaging phases of their cooperation are operative irrespective of in which direction the driving torque is transmitted through the gearing and other connections described from the member 6 to the member 56. On this account my transmission gearing unit is susceptible of being applied to machines or in applications where the driving torque may be required to be transmitted to the driven member such as the clutch 56, in opposite directions. Under these conditions, in the instance of the application of the invention to an airplane motor, all that is necessary for the use of my invention as a starter for the airplane engine, whether the engine has to be started in either of opposite directions, is to provide a clutch member 56 capable of being driven in the right direction for initiating the turning over of the engine shaft of the motor, and reverse the rotation of the motor.

The foregoing operation involves the employment of the motor for driving inertia member 6 in order to transmit driving torque from the member 6 to the driven member 56. It will be apparent, however, that when the hand crank operated means 34 is used in lieu of the motor, the drive is transmitted from the gears 33, 32, shaft 28 and bevel gear 27 to the shaft 23 that carries the sun gear 38, in a substantially direct manner. The driving of the shaft 23 by the said hand operated gearing will effect rotation of the gear 20, shaft 14, gear 13, and pinion 10 on the armature shaft 4 and since the inertia wheel 6 is carried by the armature 2, the wheel 6 may be driven at high speed through the hand crank or manual means after the same manner as said wheel can be driven by the motor itself when the latter is used.

By reason of the location of the drive housing 18 intermediate the motor housing 5 and the control unit housing 21 and the employment of suitable fastenings connecting these parts together, it is possible to set up these respective housings and their contained mechanisms with relative adjustments admitting of turning of the housing 18 and contained drive gearing to different positions in relation to the housings 5 and 21 and contained mechanisms and the securing of said drive housing 18 and internal drive gearing in any one of such adjusted positions. This affords a desirable arrangement when it is required that the manual operating means for the inertia wheel 6 shall be located in a special accessible position, and also a position not to interfere with the other parts of the engine upon which the power transmission gearing of the invention may be mounted, as for instance to operate as a starter mechanism.

Reverting to the formation of the camming teeth 47a and 48a in the manner as previously described, it is noted that such formation provides uniform axial movement of the secondary reaction and/or pressure ring 48 aside from the phase of providing for equalized wear on all of the comating tooth surfaces. By reason of the said uniform axial movement of the secondary reaction ring 48 relatively to the reaction ring 47, release and re-engagement of the friction plates 44 and 45 is effective over the entire surfaces of the plates, thus eliminating any tendency to drag or grab on the part of the friction plates that would cause incomplete separation and re-engagement of said parts interfering with the effective functions thereof in the operation of the mechanism. The foregoing advantageous result in operation of the comating teeth will cause the reaction rings to separate axially and the depth of the tooth engagement decreases as the separating movement increases, but throughout the action of the parts the contact of the toothed surfaces is maintained as surface contact, though the said surface contact decreases in proportion to the decreasing depth of engagement of the teeth.

Having thus described my invention, what I claim as new and desire to secure by Letters Patent of the United States is:

1. In a power transmission gearing of the class described, in combination, a casing comprising housing members including a torque responsive unit housing, a driving member, a driven member, and gearing intermediate said driving and driven members including a planetary gear carrier connected with the driving member, planetary gears on said carrier, a friction control unit including friction plates constituting a gear ring and intergeared to the planetary gears, other secondary friction plates interleaved with the friction plates of the gear ring for frictional cooperation therewith, a relatively rotative reaction member engaged with the first mentioned gear ring friction plates, a relatively non-rotative but axially movable reaction and pressure member cooperating with the several friction plates aforesaid for controlling their frictional cooperation, resilient means coacting with the second reaction and pressure member for effecting axial movement of the latter, and camming means intermediate the two reaction members for varying the frictional cooperation between the several friction plates aforesaid upon predetermined variation in the driving torque transmitted from the driving member to the driven member, an adjusting screw carrying plate associated with the secondary reaction and pressure member, adjusting screws on the last mentioned plate cooperative with the secondary reaction and pressure plate, the said friction plates, reaction members, and adjusting screw plate being mounted in and displaceable from one end of the control unit housing.

2. Power transmission gearings as set forth in claim 1, in which the friction plates are disposed at one end of the housing with the reaction and pressure member and adjusting screw plate superposed in reference thereto, the resilient means comprising springs interposed between the reaction and pressure member and the adjusting screw plate.

3. Power transmission gearing as set forth in claim 1, in which the friction plates are disposed at one end of the housing with the reaction and pressure member and adjusting screw plate superposed in reference thereto, the resilient means comprising springs interposed between the reaction and pressure member and the adjusting screw plate, the control unit housing being separable from the casing on a line exterior to the adjusting screw plate whereby access may be had to the friction plates, reaction members, springs and planetary gear parts on detachment of the control unit housing from the casing.

4. A friction device comprising a ring gear embodying a friction plate, a gear engaging said ring gear and forming therewith a part of a gear train, a second friction plate cooperating with the first mentioned plate, a rotative reaction ring interengaged with the second mentioned friction plate and having camming teeth thereon, a secondary reaction ring, means for holding said secondary reaction ring relatively rotatively stationary with respect to said first named reaction ring and having camming teeth comating with those of said first ring, said comating camming teeth of the reaction rings having working surfaces comprising elements closely approximating helicoidal involutes, means acting on one of said reaction rings for applying resilient pressure thereto and to the cooperating friction plates to frictionally hold the same against relative rotation until the friction between the plates is varied by the camming action of the comating camming teeth of the reaction rings, one of said rings being movable axially incident to the action of the camming teeth of the rings for effecting variation in the frictional cooperation between the friction plates, and the working surfaces of the comating camming teeth being formed by a succession of involute curves evolving from a base circle whose diameter may vary from approximately .80 to .90 of the main diameter of the reaction members, the starting points of the successive involutes forming a helix on the base circle.

5. A friction device comprising a ring gear embodying a friction plate, a gear engaging said ring gear and forming therewith a part of a gear train, a second friction plate cooperating with the first mentioned plate, a rotative reaction ring interengaged with the second mentioned friction plate and having camming teeth thereon, a secondary reaction ring, means for holding said secondary reaction ring relatively rotatively stationary with respect to said first named reaction ring and having camming teeth comating with those of said first ring, said comating camming teeth of the reaction rings having working surfaces comprising elements closely approximating helicoidal involutes, means acting on one of said reaction rings for applying resilient pressure thereto and to the cooperating friction plates to frictionally hold the same against relative rotation until the friction between the plates is varied by the camming action of the comating camming teeth of the reaction rings, one of said rings being movable axially incident to the action of the camming teeth of the rings for effecting variation in the frictional cooperation between the friction plates, and the working surfaces of the comating camming teeth consisting of a series of involute curves evolved from a base circle whose diameter is greater than .70 of the mean diameter of the reaction members, the starting points of the successive involutes forming a helix on the base circle.

RALPH M. HEINTZ.